United States Patent Office

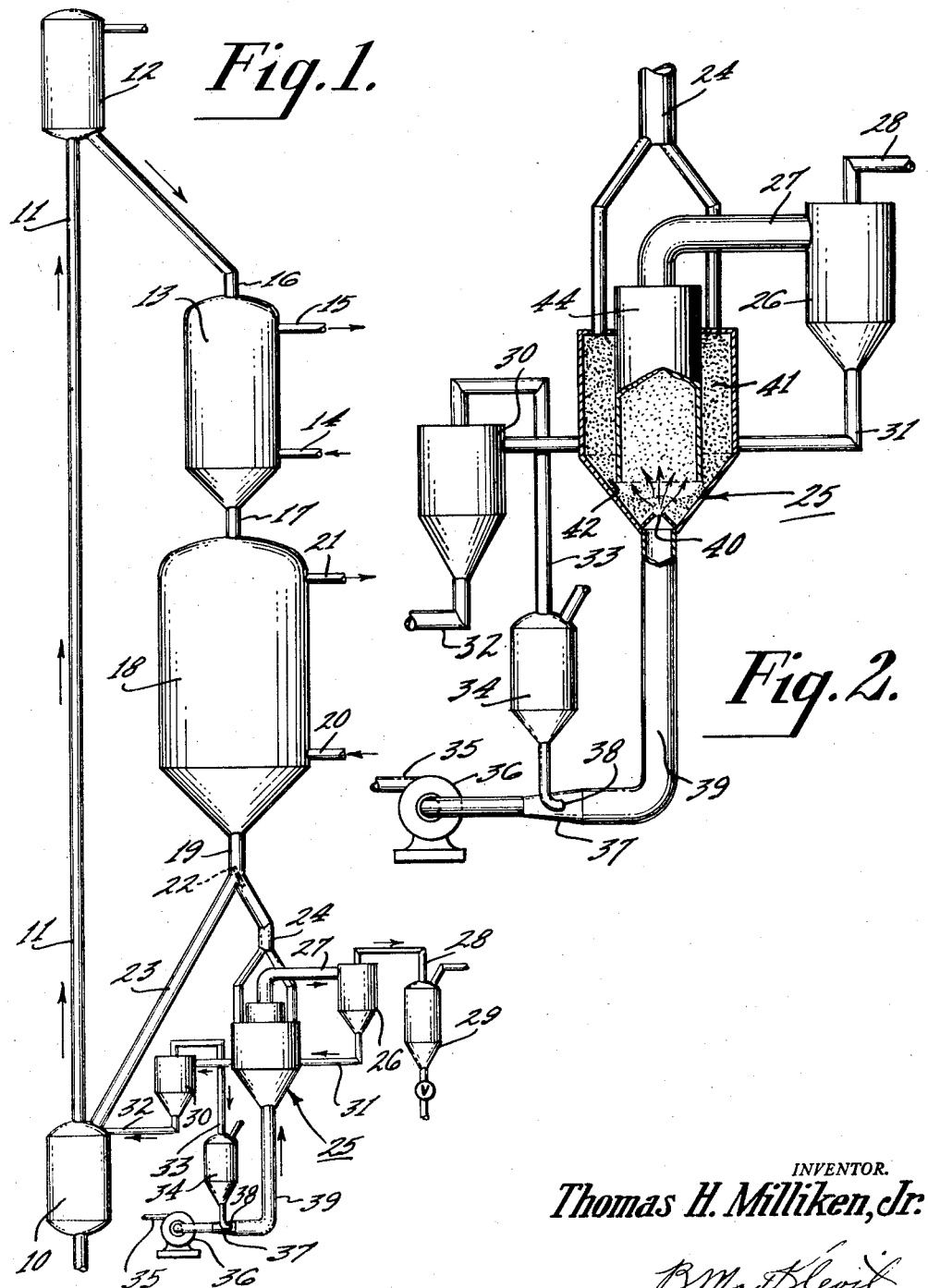

2,892,771
Patented June 30, 1959

2,892,771

REMOVING CONTAMINANTS FROM CATALYST PARTICLES

Thomas H. Milliken, Jr., Moylan, Pa., assignor to Houdry Process Corporation, Wilmington, Del., a corporation of Delaware Application September 1, 1954, Serial No. 453,641

2 Claims. (Cl. 208—149)

This invention relates to catalytic conversion of hydrocarbons and particularly to an advantageously selective method of removing petroleum ash constituents from catalyst particles of large size. A hydrocarbon cracking system having a gravitating bed of cracking catalyst particles uses beads, pellets or the like having typical minimum dimensions within the range from about 2 to 13 mm., conveniently designated as large size particles to distinguish from fluidized catalyst particles. Adverse results have heretofore been obtained in cracking hydrocarbons in the presence of catalyst particles having deposited contaminants, nickel and vanadium being the particularly troublesome petroleum ash constituents.

In a petroleum cracking unit characterized by a gravitating bed, the rubbing and rolling of the particles against each other, and the impact resulting from the movement of the particles result in the formation of finely divided material generally designated as fines. The term "attrition" is employed to describe this fine-forming phenomena of the normal operation of a gravitating bed unit, which phenomena is conveniently typified as the action of particles of equal hardness on each other. Efforts have been made to provide particles having a higher degree of hardness, thereby slightly decreasing the attrition rates, and thereby reducing the rates of catalyst replacement.

In the cracking of hydrocarbons containing more than about 0.1 p.p.m. (parts per million) of nickel and/or vanadium, it has been observed that the catalyst particles were susceptible to accelerated aging. Heavy metal contaminants, including not only the particularly troublesome nickel and vanadium, but also iron, copper, and other heavy metals, are deposited on gravitating particles of cracking catalyst, and adversely affect the activity and selectivity of the cracking operation. Catalyst particles containing more than about 200 p.p.m. deposited contaminants of the class consisting of nickel and vanadium are not suitable as cracking catalysts for efficient operation of conventional cracking units. It has been observed that the fines resulting from the normal attrition of a gravitating bed of catalyst particles contain a concentration of heavy metal contaminants several times greater than the catalyst particles from which the fines were removed. The gravitating bed units have important advantages over cracking units employing a fluidized catalyst, particularly in the processing of hydrocarbons containing relatively large amounts of heavy metals, (e.g. 5 p.p.m. total and/or 1 p.p.m. nickel) by reason of the preferential concentration of the heavy metal contaminants in the fines. However, the concentration of nickel and vanadium contaminants in the fines, even when ten times as great as in the circulating catalyst particles, is much less than 1% of the fines. Thus significant losses of catalyst are involved in the removal of the nickel and vanadium contaminants as an enriched trace portion of the fines resulting from attrition of the catalyst particles.

It has been proposed that the hardness of a catalyst particle be controlled in accordance with the heavy metals content of the oil being cracked. Thus by using a softer catalyst particle, and increasing the attrition rates in the gravitating bed, oils containing higher concentrations of heavy metals can be processed without exceeding the operable limit of about 200 p.p.m. of deposited troublesome contaminants in the circulating catalyst. Because the fines contain less than 1% vanadium and/or nickel, the use of a relatively soft catalyst particle in processing oils containing relatively high concentrations of heavy metals involves a considerable cost for catalyst replacement.

In accordance with the present invention, the petroleum ash constituents are removed from large catalyst particles more selectively than by the attrition action of the operation of a gravitating bed unit. This selective removal of the contaminants is accomplished by subjecting to an abrading treatment a portion of the moving bed of catalyst particles adapted to circulate about a closed path comprising a cracking zone and a regenerating zone. This abrading treatment employs abrasive granules having a structure different from the catalyst particles, and having a hardness greater than the catalyst particles. In preferred embodiments, the abrasive granules have a size significantly smaller than the catalyst particles and significantly larger than the fines resulting from the attrition of the catalyst. By this abrading treatment, there is removed from the catalyst particles a thin outer layer, constituting only a small percentage by volume of the catalyst particle, but containing a significantly higher concentration of the petroleum ash constituents (including not only the nickel and/or vanadium contaminants, but also sodium, calcium, iron and other ash components) than the circulating catalyst.

The removal of the ash constituents by abrasion is more selective than the removal of ash constituents by attrition, thereby making possible the removal of a given quantity of ash constituents with a smaller catalyst loss.

In the accompanying drawings, Figure 1 is a schematic flow sheet of an embodiment of the invention in which a portion of the circulating catalyst can bypass the abrading treatment zone.

Figure 2 is a schematic view of the abrading chamber and pneumatic separator.

In the method of cracking hydrocarbons illustrated in the flow sheet of Figure 1, catalyst particles can be lifted from a lower lift hopper 10 through a pneumatic lift pipe 11 to an upper lift hopper 12, from which they can flow to a cracking chamber 13. Hydrocarbons can enter the cracking chamber 13 through an inlet 14, and undergo cracking reactions to form products leaving through exit 15. Particles of cracking catalyst entering the cracking chamber 13 through inlet 16 gravitate through the cracking chamber and leave through a pressure leg 17. As a result of the cracking reactions, there is deposited on and in the catalyst particles a carbonaceous material conveniently designated as coke, which is burned off of the catalyst particles in a kiln 18. The particles gravitate from the pipe 17, through the kiln 18, and into the exit pipe 19. An oxygen-containing gas can be fed into the kiln through an inlet or series of inlets 20, and flue gas can be withdrawn through a flue 21.

Particular attention is directed to an abrading treatment zone positioned between the kiln 18 and the lower lift hopper 10 of the circulatory path of the catalyst particles. At a bifurcated portion of the exit pipe 19, a regulator 22 can direct a controlled portion through a by-pass conduit 23, the balance of the catalyst particles being withdrawn through a pipe 24 and directed into an abrading apparatus 25. A stream of gas containing finely divided abrasive granules can be introduced into the abrading apparatus 25 in such a manner as to bring about a small amount of surface abrasion of the catalyst particles. From the abrading apparatus 25, there is withdrawn a mixture of gas and suspended particles (comprising catalyst particles characterized by said removal of the thin film, abrasive granules, fines resulting from the abrasion of the large catalyst particles, attrition fines, and fines resulting from the disintegration of the abrasive granules) which mixture can be passed from the abrading device 25 to a preliminary separator 26 through a conduit 27. The fines resulting from the attrition of the catalyst particles in the gravitating bed and from the abrasive action of the granules on the catalyst particles in the abrading device 25 can be removed in the preliminary separator 26 and transferred through conduit 28 into a receptacle 29. In the preliminary separator 26 a mixture of catalyst particles and the relatively large abrasive granules can be recovered and directed to a secondary separator 30 through conduit 31. Catalyst particles are withdrawn from the bottom of the secondary separator 30 and transmitted to the lower lift hopper 10 through a conduit 32. The abrasive granules recovered in the secondary separator 30 are transmitted through a conduit 33 to a storage bin 34 from which the granules are recirculated through the abrading apparatus 25.

In the operation of the method schematically shown in Figure 1, hydrocarbons, whether of low ash content or of high ash content, are subjected to a cracking operation in the cracking chamber 13. The invention is especially advantageous in the catalytic cracking of hydrocarbons containing relatively large amounts of heavy metals of the class consisting of nickel and vanadium. Contaminants comprising compounds of metals are deposited on the catalyst particles in the cracking chamber 13. Hydrocarbon materials of lower molecular weight than the hydrocarbon feed material are the desired and principal product of the cracking chamber 13. The particles of cracking catalyst pass through the kiln 18 in which an oxygen-containing gas brings about the combustion of the carbonaceous deposit in the catalyst particles, but the ash contaminants are not thereby removed from the catalyst. The de-coked catalyst particles are divided into two parts, a portion of which by-passes the abrading treatment zone through a by-pass conduit 23, and a portion of the de-coked catalyst particles are transferred to the abrading apparatus 25. There a stream of abrasive granules in a fast moving gas stream removes a thin film from certain catalyst particles. The gas stream leaving the abrading chamber passes through the preliminary pneumatic separator 26, in which the fines are removed through conduit 28, the remainder of particles (catalyst particles and abrasive granules) passing through conduit 31, to the secondary separator 30, from which the abrasive granules are withdrawn through conduit 33, and the catalyst particles are withdrawn through conduit 32. The fines accumulating in bin 29, have a concentration of petroleum ash components (e.g. sodium, calcium, iron, nickel and/or vanadium, but excluding cracking catalyst components such as silicon and aluminum) higher than the concentration of petroleum ash components in the catalyst particles leaving the kiln. Inasmuch as the abrading treatment brings about a reduction in the petroleum ash content of the catalyst particles, this method makes possible the cracking of hydrocarbon fractions containing larger amounts of petroleum ash than would be feasible in methods which did not employ the abrading zone of the present invention.

It has been noted that the abrasion of the catalyst particles by a rapidly moving gas stream of suspended abrasive granules removes a film of substantially uniform thickness, regardless of the shape or size of the catalyst particle. For example, a rod shaped pellet can be abraded many times until its weight is significantly less than the initial pellet, and still retain its rod-like configuration. Thus the action of the abrading treatment differs significantly from the action of attrition in a gravitating bed.

It is cheaper to produce certain types of cylindrical rods of catalyst than it is to produce spherical beads. A significant proportion of the currently operated gravitating bed cracking units employ such cylindrical rods instead of spherical beads of cracking catalyst. One of the several disadvantages of using relatively soft catalyst particles is that such cylindrical rods, when subjected to severe attrition conditions, tend to be rounded off at the ends, and to become egg shaped, round ended, and otherwise different from their initial cylindrical shape. Such tendencies are somewhat overcome by employing relatively hard and attrition resistant catalyst particles of cylindrical shape. If the cylindrically shaped catalyst particles are allowed to become round ended, the resistance to flow within the gravitating bed undergoes a change. Any sudden or unpredictable change in the flow characteristics of the gravitating bed makes the operation of the unit more difficult.

Accordingly, it is desirable to control the operation to avoid an excessively short life for the cylindrical shape of a fresh catalyst. In the abrading treatment the cylindrical rods of catalyst particles undergo the removal of a uniform thin film. Surprisingly, the action of the abrasive laden gas produces significantly less rounding of the edges than produced by attrition to the particles, there being the same (e.g. 5%) weight loss in each case. Thus the abrading treatment does not affect the flow characteristics of the gravitating bed of cylindrical rod particles as adversely as an equivalent weight loss attributable to attrition. Moreover, in the abrading treatment of the present invention as applied to spherical beads, the abrasive granules suspended in the gas stream tend to remove a very thin film of substantially uniform thickness whether the gas suspended spherical bead is relatively large or relatively small.

Referring now to Figure 2 there is shown suitable means for accomplishing the abrading of catalyst particles and the pneumatic separation of the particles in the gas stream from the abrading zone.

An inlet 35 can provide air to a compressor 36 feeding compressed air to a nozzle 37. Thus a relatively tiny stream of abrasive granules is drawn from the abrasive storage bin 34 to a jet 38 to provide a very dilute suspension of granules in air. The abrasive laden gas stream resulting from the interaction of the compressed air and abrasive granule jet 38 moves upwardly through a conduit 39. The gas stream containing a very dilute concentration of suspended abrasive granules enters the abrading device 25 through a restricted orifice 40 in such a manner as to entrain a quantity of catalyst particles constituting from 1 to 30 times the volume of the abrasive granules entrained in the gas stream. The catalyst particles directed to the abrading device 25 enter an annular bin 41 through conduits 26, and gravitate downward through a restricted opening 42 into a small heap of particles feeding to the orifice 40, at which they are pneumatically lifted into and through an abrading chamber 44. In the abrading chamber the rapidly moving gas stream, containing the entrained catalyst particles, and a quantity of harder abrasive granules ordinarily significantly less than the volume of catalyst particles, moves upwardly under conditions such as to minimize the attrition losses which might result from collisions between catalyst particles. The small volume of abrasive granules moves relatively faster than the catalyst particles and brings about the removal of a thin, relatively uniform film from substantially each of the catalyst particles.

The concentration of the abrasive granules in the gas stream in the abrading chamber is carefully restricted in order to prevent excessive abrasion of the catalyst particles. By carefully controlling the lift conditions in order to minimize collisions between catalyst particles within the abrading chamber, and by maintaining a volume concentration of the relatively hard abrasive granules smaller than the volume concentration of catalyst particles in the abrading zone, the film removed from the catalyst particles is both relatively thin and relatively uniform.

The gas stream comprising the lift gas, catalyst particles, and the fines resulting from the attrition of the catalyst particles in the gravitating bed and resulting from the abrasive action within the abrading chamber 44 are transmitted through a conduit 27 to the preliminary pneumatic separator 26 and a portion thence moves to the secondary separator 30. In this manner there are separated catalyst fines through line 28, abrasive granules through line 33 and catalyst particles through line 32.

It is the method of abrading of a thin film from a large particle by treatment with a more dilute concentration of relatively harder abrasive granules which accounts for some of the advantages of the present invention. If desired, the catalyst particles can fall through a short abrading chamber either concurrently or countercurrently to the abrasive laden gas stream, or other modifications of the general procedure may be employed.

The abrasive granules may be of any material significantly harder than the catalyst particles. The product resulting from the crushing of a thin film of chilled aluminum silicate, resulting from fusing catalyst fines, can be employed as an abrasive. Although the fused fines possess a chemical composition nearly the same as the catalyst particles (notwithstanding the enrichment of the petroleum ash components), they possess a structure different from the catalyst particles. It is the hardness, rather than the chemical composition of the abrasive which is particularly important. Ordinarily it is desirable to employ fused alumina, silicon carbide, or preferably sand as the abrasive granules.

It should be noted that careful control is exercised to maintain the sizes of the particles such that they may readily gravitate as a non-turbulently moving bed. Thus the minimum dimension of any of the catalyst particles is generally within the range of from about 0.05 to 0.5 inch (1 to 13 mm.). If cylindrical rods of catalyst are utilized, the diameter of the particles may be somewhat smaller than the axial length thereof. If spherical beads of catalyst are employed, the diameter thereof is generally within the range of from about 2 to 13 mm. The catalyst fines, whether resulting from attrition or from abrasion, are of very small size and are generally of the magnitude of from 1 to 50 microns (0.001 to 0.050 mm.)

The simplified separation of particles according to preferred embodiments of the present invention is attributable in part to the use of abrasive granules significantly larger than the typical catalyst fines, and significantly smaller than the catalyst particles suitable for the non-turbulently moving bed. If the abrasive granules are to be separated from larger and smaller particles, then it is generally necessary to control the size of the abrasive granules to within the range of from about 100 to about 800 microns. The abrasive granules, after being reduced in size to the magnitude of catalyst fines, are desirably withdrawn from the system. In any event, care is exercised so that catalyst fines are to a large extent removed from the abrasive granules recirculated to the abrasive-laden gas stream, and particle size provides a convenient criteria for accomplishing this separation.

In alternative embodiments of the invention abrasive granules smaller than 100 microns may be utilized, in which case the separation between the abrasive granules and the catalyst fines is accomplished by reason of the differences in density, hardness, or suitable property of the abrasive granules relative to the catalyst fines instead of by reason of the differences in the size of the particles.

Of particular importance is the fact that the removal of a thin outer portion of a relatively large catalyst particle is accomplished by abrasive granules having a hardness significantly greater than that of the catalyst particles. In this manner it is feasible to remove a film which is both very thin and relatively uniform from the catalyst particles with a relatively small alteration in the general configuration of the catalyst particle. Thus, it is possible to achieve relatively low replacement rates for the catalyst particles, particularly if they are relatively hard and attrition resistant. Although the low replacement rates constitute one of the most important advantages of abrading gas-suspended particles, it has also been noted that the flow characteristics of the gravitating bed are improved when attrition losses are minimized and the particles are reduced in size primarily by abrasion.

The removal of a thin outer film from the catalyst particles in the abrading device is accomplished in large part by the abrasive granules, thereby achieving results distinguishable from the size reduction of particles by the action of catalyst fines in a gas lift and similar equal-hardness particle contacts. It is convenient to employ the term "abrasion" to describe the action of a relatively hard upon a relatively softer material, and the term "attrition" to describe the action of a particle upon another particle of substantially the same hardness.

The quantity of abrasive granules present in the abrading chamber 44 relative to the quantity of catalyst particles is controlled so that the catalyst particles constitute from about 1 to 33 times the volume of the abrasive granules, and so that the granules constitute more than about 3% but less than about 99% by volume of the catalyst particles. The flow of abrasive granules is restricted in such a manner relative to the flow of catalyst particles that generally the volume of catalyst particles in the abrading chamber is significantly greater than the volume of abrasive granules therein.

Obviously many modifications and variations of the invention as hereinbefore set forth may be made without departing from the spirit and scope thereof, and therefore only such limitations should be imposed as are indicated in the appended claims.

What is claimed is:

1. The method of treating a circulating stream of hydrocarbon cracking catalyst particles contaminated with deposits of petroleum ash components from the group consisting of nickel and vanadium, said particles having a minimum dimension within the range from about 2 to 13 mm., wherein said catalyst particles are circulated as a main stream through a closed path comprising a cracking zone, a regeneration zone and a lift zone and wherein said particles are gravitated in compact bed form through said cracking zone and said regeneration zone, which method comprises: withdrawing as a side stream a portion of the particles from the aforesaid main circulating stream, passing the withdrawn portion to a treatment zone, subjecting the particles in said treatment zone to the action of a rapidly moving gas stream containing suspended abrasive granules significantly harder than the catalyst particles and being of an average size range smaller than that of the catalyst particles, whereby catalyst fines are produced by selectively abrading off a substantially uniform thin outer layer from each of said contaminated particles, said catalyst fines being of a size magnitude including particles up to 50 microns and being significantly smaller than said abrasive granules, passing the mixture of fines, abrasive granules and catalyst particles into a separator, withdrawing the fines of up to about 50 micron size, recirculating the abrasive granules to said rapidly moving gas stream, returning the abraded catalyst particles to the main circulating stream of catalyst for admixture therein, and recirculating the so admixed catalyst particles through said cracking zone, whereby the content of such petroleum ash components is maintained below the maximum limit of about 200 parts per million in the main stream of circulating catalyst.

2. The method in accordance with claim 1 wherein the abrasive granules are of a size range of approximately 100 to 800 microns and the volume concentration of said abrasive granules constitutes more than about 3%, but less than about 99% of the catalyst particles in said treatment zone.

References Cited in the file of this patent

UNITED STATES PATENTS

| | | |
|---|---|---|
| 1,412,219 | Richardson | Apr. 11, 1922 |
| 2,361,922 | Andrews | Nov. 7, 1944 |
| 2,392,019 | Wiegand | Jan. 1, 1946 |
| 2,567,207 | Hoge | Sept. 11, 1951 |
| 2,591,988 | Willcox | Apr. 8, 1952 |
| 2,598,309 | Say et al. | May 27, 1952 |
| 2,651,600 | Taff et al. | Sept. 8, 1953 |
| 2,683,683 | Mills | July 13, 1954 |
| 2,710,512 | Cronan | June 14, 1955 |